(12) United States Patent
Buchanan et al.

(10) Patent No.: US 7,890,743 B2
(45) Date of Patent: Feb. 15, 2011

(54) METHOD AND APPARATUS FOR CONFIGURING A DEVICE BASED ON PROXIMITY TO ANOTHER DEVICE

(75) Inventors: Annette L. Buchanan, Neptune, NJ (US); Sally Ann C. Mcilhinney, Bridgewater, NJ (US); Adonny W. Raphael, Holmdel, NJ (US); Terry E. Schmalzried, Morganville, NJ (US)

(73) Assignee: Avaya Inc., Basking Ridge, NJ (US)

( * ) Notice: Subject to any disclaimer, the term of this patent is extended or adjusted under 35 U.S.C. 154(b) by 555 days.

(21) Appl. No.: 11/863,917

(22) Filed: Sep. 28, 2007

(65) Prior Publication Data

US 2009/0089565 A1    Apr. 2, 2009

(51) Int. Cl.
| | |
|---|---|
| G06F 9/00 | (2006.01) |
| G06F 21/00 | (2006.01) |
| G08B 1/08 | (2006.01) |
| G08B 13/14 | (2006.01) |
| G08B 21/00 | (2006.01) |
| H04M 11/00 | (2006.01) |
| H04M 1/66 | (2006.01) |
| H04M 3/00 | (2006.01) |
| H04B 1/06 | (2006.01) |
| G06F 12/00 | (2006.01) |
| G06F 7/04 | (2006.01) |
| G06F 1/26 | (2006.01) |

(52) U.S. Cl. ............ 713/1; 713/100; 713/182; 340/539.23; 340/568.1; 340/686.6; 379/93.02; 455/26.1; 455/410; 455/419; 726/21; 726/27; 726/35

(58) Field of Classification Search ............ 713/1, 713/100, 182; 379/93.02; 455/26.1, 410, 455/419; 726/21, 27, 35; 340/539.23, 568.1, 340/686.6
See application file for complete search history.

(56) References Cited

U.S. PATENT DOCUMENTS 5,739,746 A * 4/1998 Shaffer et al. ............ 340/425.5

(Continued)

OTHER PUBLICATIONS

Audio System with removable, active faceplate Downloaded on Jan. 14, 2008 http://www freepatentsonline com/6856043 html.

(Continued)

Primary Examiner—Stefan Stoynov
(74) Attorney, Agent, or Firm—Joseph B. Ryan; Jason Paul DeMont; Wayne S. Breyer

(57) ABSTRACT

Methods and apparatus are provided for configuring a device based on proximity to another device. A user device is configured by obtaining one or more configuration rules that establish one or more configuration parameters of the user device based on a proximity to one or more additional general purpose devices; determining whether one or more of the configuration rules are satisfied; and configuring the user device based on the satisfied one or more configuration rules. The configuration rules can be configured by an authorized user of the user device. The proximity comprises a predefined physical relationship between devices that is based on distance, such as a radius around a given device, or a physical relationship, such as in the same room or building, or within a communication range of a device.

23 Claims, 3 Drawing Sheets

U.S. PATENT DOCUMENTS

| | | | | |
|---|---|---|---|---|
| 5,757,271 | A | * | 5/1998 | Andrews .................. 340/568.1 |
| 6,151,493 | A | | 11/2000 | Sasakura et al. |
| 6,504,480 | B1 | * | 1/2003 | Magnuson et al. .......... 340/571 |
| 6,956,480 | B2 | | 10/2005 | Jespersen |
| 7,107,455 | B1 | * | 9/2006 | Merkin ....................... 713/182 |
| 7,248,865 | B2 | * | 7/2007 | Imura ......................... 455/421 |
| 7,715,790 | B1 | * | 5/2010 | Kennedy ................... 455/41.2 |

OTHER PUBLICATIONS

"Masterlock 1317D," Downloaded on Jan. 14, 2008, http://www.masterlocks.com/item_master.asp?CID=377.

"Password—Wikipedia, the free encyclopedia," Downloaded on Jan. 14, 2008, http://en wikipedia org/wiki/Password.

"Security token—Wikipedia, the free encyclopedia," Downloaded on Jan. 14, 2008, http://en wikipedia org/wiki/Security_token.

Promise Training Center, Downloaded on Jan. 14, 2008 http://training promise no/training/mod/glossary/view php? id=20&mode=date &hook=&sortkey=CREATION&sortorder=asc&fullsearch=0 &page=1.

"Dongle" downloaded on Jan. 14, 2008, http://en wikipedia.org/wiki/Dongle.

* cited by examiner

LAPTOP PROXIMITY RULEBASE - 200

202 — OPERATE IF WITHIN RANGE OF MY CELL PHONE OR PDA;

204 — OPERATE IF ETHERNET CONNECTION TO LOCAL ENTERPRISE SERVER IS PRESENT

206 — ENTER QUIET MODE IF WITHIN 15 FEET OF LIBRARY SERVER

208 — USE EXTERNAL MONITOR IF WITHIN PREDEFINED PROXIMITY

210 — OVERRIDE PASSWORD=PROXIMITY

FIG. 2B

CHILD DEVICE PROXIMITY RULEBASE - 200-B

- 220 — OPERATE WITH PARENTAL CONTROLS ENABLED IF WITHIN RANGE OF PARENT CELL PHONE;
- 222 — OPERATE WITH LIMITED FUNCTIONALITY IF OUTSIDE RANGE OF PARENT CELL PHONE;
- 224 — DISABLE GAMES IF WITHIN RANGE OF SCHOOL WiFi ROUTER
- 226 — SUSPEND OPERATION IF NOT WITHIN RANGE OF FAMILY WiFi ROUTER;
- 228 — OVERRIDE PASSWORD=PARENT

FIG. 2C

RETAIL PROXIMITY RULEBASE - 200-C

- 230 — OPERATE ONLY WITHIN RANGE OF RETAIL STORE WiFi ROUTER UNTIL RECONFIGURED FOR SHIPMENT OR PURCHASE;
- 232 — FOLLOWING RECONFIGURATION FOR SHIPMENT, DO NOT OPERATE UNTIL WITHIN PROXIMITY OF BUYER'S HOME (e.g., WITHIN RANGE OF CELL PHONE WITH DESIGNATED PHONE NUMBER OR ANOTHER ENABLING DEVICE AT DESTINATION)
- 234 — OVERRIDE PASSWORD=RETAIL

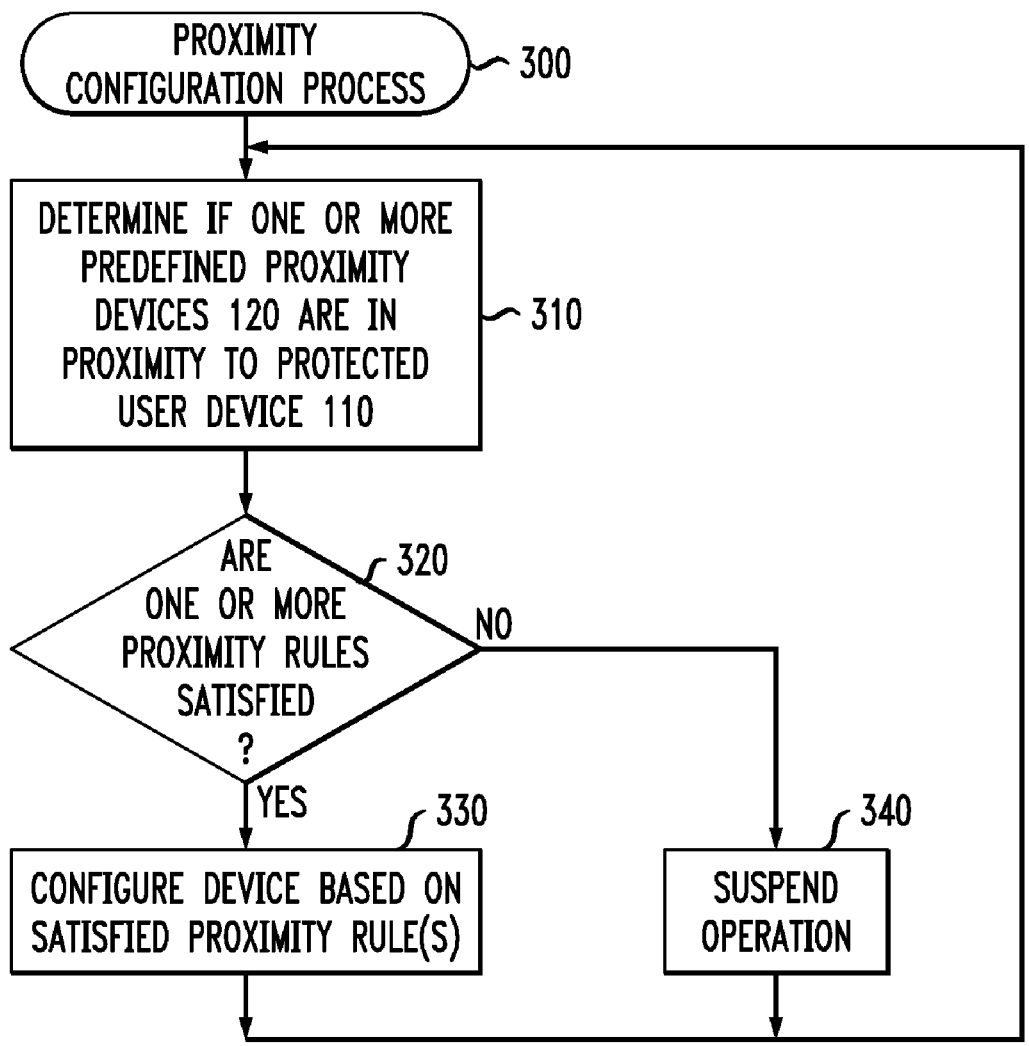

METHOD AND APPARATUS FOR CONFIGURING A DEVICE BASED ON PROXIMITY TO ANOTHER DEVICE

FIELD OF THE INVENTION

The present invention relates generally to the configuration of user devices, such as portable computers, and more particularly, to methods and apparatus for configuring one or more user devices based on proximity to another device.

BACKGROUND OF THE INVENTION

Laptop computers and other portable devices are easily stolen or lost. This is especially true for devices that are normally used by children. The cost of such a loss can often be significant, especially when the value of any data or other information that was stored on the stolen device is considered. As the size and weight of consumer devices decrease, the devices become even easier to conceal and steal.

Mechanical techniques are often employed to prevent the theft of such devices For example, a number of physical locks, keys and other enabling devices are commercially available that allow a user to secure a laptop or another device. Such hardware solutions, however; may increase the size and weight of the portable device and require the user to manage additional hardware.

In addition to the physical security of a device, many devices employ access control features that limit who may use a given device and how the given device may be used by such authorized users. Devices employed by children, for example, often incorporate "parental control" features, whereby a parent can control how and when a device may be used. For example a parent can typically selectively enable device features of a device. In addition, a parent may require that the parent is nearby before a child can operate a device or access certain features of the device, such as certain restricted web sites.

A need exists for methods and apparatus for configuring a device based on proximity to one or more additional devices. A further need exists for methods and apparatus for controlling the operation of a device based on proximity to one or more additional devices.

SUMMARY OF THE INVENTION

Generally, methods and apparatus are provided for configuring a device based on proximity to another device. According to one aspect of the invention, a user device is configured by obtaining one or mole configuration rules that establish one or more configuration parameters of the user device based on a proximity to one or more additional general purpose devices; determining whether one or more of the configuration rules are satisfied; and configuring the user device based on the satisfied one or more configuration rules. The configuration rules can be configured by an authorized user of the user device. The proximity comprises a predefined physical relationship between devices that is based on distance, such as a radius around a given device, or a physical relationship, such as in the same room or building, or within a communication range of a device.

The configuration parameters based on the proximity of one or more of the additional general purpose devices can comprise: for example, whether the user device can operate; one or more access control parameters of the user device; one or more parental control parameters of the user device; a quiet or mute mode of the user device; and a suspend mode for the user device. The configuration parameters can optionally trigger a local process on the user device based on the proximity. In a further variation, additional general purpose device provides a proximity environmental cue to the user device, such as an indication that the user device is in a quiet environment, such as a library.

A more complete understanding of the present invention, as well as further features and advantages of the present invention, will be obtained by reference to the following detailed description and drawings.

BRIEF DESCRIPTION OF THE DRAWINGS

FIG. 1 illustrates a protected user device that is configured in accordance with the present invention based on proximity to one or more proximity devices;

FIGS. 2A through 2C are alternative sample tables from the proximity rulebase maintained by the protected user device of FIG. 1 for various exemplary implementations of the present invention; and FIG. 3 is a flow chart describing an exemplary proximity configuration process incorporating features of the present invention and implemented by the protected user device of FIG. 1.

DETAILED DESCRIPTION

Figures 1, 2A:
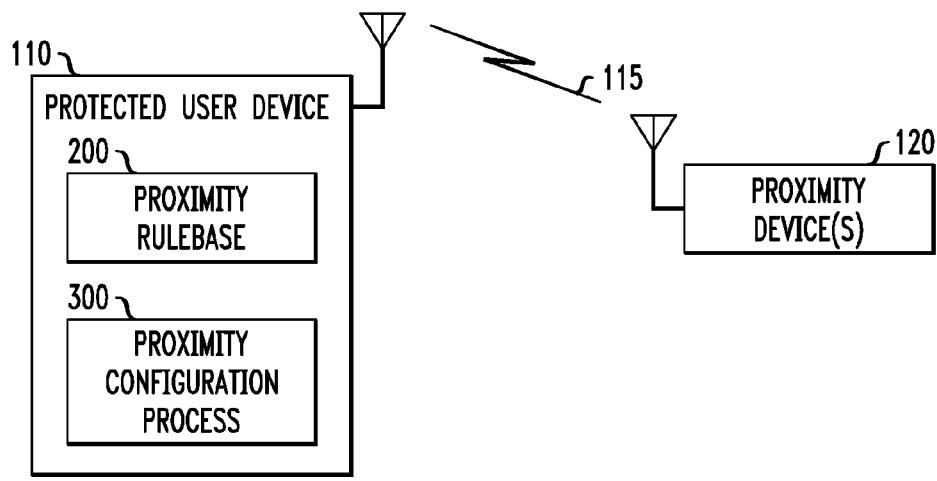

The present invention provides methods and apparatus for configuring a device based on proximity to another predefined device. As used herein, the term "proximity" shall mean a predefined physical relationship between devices that is based on distance, such as a radius around a given device, or a physical relationship, such as in the same room or building, or within a communication range of a device, which can be an approximate or varying distance. According to one aspect of the present invention, a device (or one or more features on the device) is only enabled when the device is within a predefined proximity of one or mole additional enabling devices. Thus, the device, or the one or more features on the device, will not operate if the device is not within the predefined proximity of the specified enabling devices According to a further aspect of the invention, the owner of a given device can specify the one or more additional enabling devices that enable the given device, as well as any other desired enabling conditions, such as the desired proximity. In this manner; if the protected device is separated from the enabling device, the owner of the protected device can control how and whether the protected device operates when outside the proximity of the enabling device.

FIG. 1 illustrates a protected user device 110 that is automatically configured in accordance with the present invention based on a predefined proximity to one or more proximity devices 120. The protected user device 110 and proximity devices 120 can be any device that can communicate with another device, such as a portable computer, cellular telephone, game console, RFID tag, workstation or personal digital assistant (PDA) For example, each protected user device 110 and proximity device 120 at least sends or receives data or a signal or otherwise provides data that can be read by another device, such as an RFID tag that impedes and distorts a transmitted signal, and the distorted, reflected signal becomes data for the transmitting device to read. The protected user device 110 and proximity devices 120 can communicate indirectly by means of a wired or wireless (including optical and cellular) network connection 115 or directly by means of a wired or wireless connection 115 between the devices. For example, the protected user device 110 and proximity devices 120 can communicate by means of a Bluetooth connection, an RFID transmission, a WiFi connection (for example, based on an IEEE 802.11 standard) or an Ethernet connection. The proximity devices 120 need not have the same owner as the protected user device 110. The proximity devices 120 are generally required to be within "proximity," as used herein, of the protected user device 110, such as within a specified distance (for example, as ascertained by a round-trip communication test). The proximity devices 120 may be identified based on a username of the user, a defined physical location, a processor identifier, a Media Access Control (MAC) address, a Service Set Identifier (SSID), or an IP address or another identifier.

As shown in FIG. 1, a protected user device 110 determines if one or more predefined proximity devices 120 are within a predefined proximity of the protected user device 110. The protected user device 110 includes a proximity rulebase 200, discussed further below in conjunction with FIGS. 2A through 2C, that record one or more proximity rules that define how the protected user device 110 is automatically configured based on a predefined proximity to the one or mole proximity devices 120. In addition, the protected user device 110 includes a proximity configuration process 300, discussed hither below in conjunction with FIG. 3, that monitors the environment of the protected user device 110 to identify devices that are within proximity. The proximity configuration process 300 determines if one or more proximity rules from the laptop proximity rulebase 200 are satisfied. If any proximity rules are satisfied, the protected user device 110 is automatically configured based on the satisfied rule(s).

As used herein, the term "general purpose devices" shall include general purpose devices as well as devices having a primary purpose other than enablement of the protected device. For example, a user may have an REID tag in his or her car for purposes of paying tolls. The present invention recognizes, however, that this RFID tag provides an environmental cue that the user is in his or her car. One or more of the user's devices may be configured or enabled based on the proximity to the RFID tag in the ca. Similarly, a library sign may be provided with an REID tag or another emitter that indicates a quiet environment. One or more devices may be configured or enabled based on the proximity to the RFID tag in the library, such as automatically entering a quiet mode.

FIGS. 2A through 2C are alternative sample tables from the proximity rulebase 200, 200-B and 200-C maintained by the protected user device 110 of FIG. 1, for various exemplary implementations of the present invention. In one embodiment, the proximity rules in the rulebases 200, 200-B and 200-C are configurable by the owner of the protected user device 110. FIG. 2A illustrates an exemplary sample table from the proximity rulebase 200 maintained by the protected user device 110 of FIG. 1, that may be employed by an exemplary laptop implementation of the present invention. Generally, the proximity rulebase 200 records one or more proximity rules that define how the protected user device 110 is automatically configured based on a predefined proximity to the one or more proximity devices 120.

As shown in FIG. 2A, the exemplary proximity rulebase 200 includes a plurality of entries 202-210, each associated with a different proximity rule. For each proximity rule, the laptop proximity rulebase 200 indicates the trigger condition, and the corresponding action For example, for rule 202, the trigger condition is a requirement that the laptop is within range of the owner's cell phone or PDA, and if so, the protected user device 110 can operate. Similarly for rule 204, the device 110 can operate if an Ethernet connection is present to a local enterprise server (for example, within a predefined radius of the protected user device 110). Rules 206 and 208 provide configuration rules that are based on proximity, such as entering a quiet mode if the protected user device 110 is within 15 feet of a defined server in a library (or another normally quiet location) or using an external monitor if the external monitor is within a predefined proximity. Finally, rule 210 provides an override password, that allows someone with the password to operate the protected user device 110 even if another proximity rule 202-208 is not satisfied. In further variations, stronger override methods may be employed to override the configuration rules, such as PKI asymmetric cryptographic keys, secure tokens with PKI, biometric, time-changing challenge-response passwords, and two-factor authentication. The owner of the protected user device 110 may optionally allow exceptions, such as allowing emergency calls, such as 911 calls, regardless of proximity.

FIG. 2B illustrates an exemplary sample table from the proximity rulebase 200-B maintained by the protected user device 110 of FIG. 1, that may be employed by an exemplary child device implementation of the present invention Like the rulebase of FIG. 2A, the proximity rulebase 200-B records one or more proximity rules that define how the protected user device 110 is automatically configured based on a predefined proximity to the one or more proximity devices 120.

As shown in FIG. 2B, the exemplary proximity rulebase 200-B includes a plurality of entries 220-228, each associated with a different proximity rule. For each proximity rule, the child device proximity rulebase 200-B indicates the trigger condition, and the corresponding action. For example, for rule 220, the trigger condition is a requirement that the child device is within range of the cell phone of the child's parent, and if so, the child device 110 can operate with parental controls enabled. Likewise, for rule 222, the child device 110 can operate with specified limited functionality (such as Internet browsing disabled) if outside the range of the parent's cell phone. Rule 224 provides a configuration rule based on proximity, that disables games on the child device 110, if the device 110 is within range of a defined school WiFi router. Rule 226 suspends operation of the device 110 if the device 110 is not within range of a defined family WiFi router. Finally, rule 228 provides an override password, that allows someone with the password to operate the child device 110 even if another proximity rule 220-226 is not satisfied.

FIG. 2C illustrates an exemplary sample table from the proximity rulebase 200-C maintained by the protected user device 110 of FIG. 1, that may be employed by an exemplary retail device implementation of the present invention. For example, the retail proximity rulebase 200-C can include one or more rules that define how a device 110 is configured for various stages of the retail chain, as determined by proximity to particular proximity devices 120. For example, a proximity device 120 in a warehouse can control configuration before the device 110 reaches the store, a proximity device 120 in a given retail store can control configuration once the device 110 reaches the store, and a proximity device 120 in the vicinity of the purchaser's home can control configuration once the device 110 reaches the purchaser's home. Like the rulebases of FIGS. 2A and 2B, the proximity rulebase 200-C records one or more proximity rules that define how the protected user device 110 is automatically configured based on a predefined proximity to the one or more proximity devices 120.

As shown in FIG. 2C, the exemplary proximity rulebase 200-C includes a plurality of entries 230-234, each associated with a different proximity rule. For each proximity rule, the proximity rulebase 200-C indicates the trigger condition, and the corresponding action. For example, for rule 230, the trigger condition is a requirement that the device 110 is within range of a defined WiFi router in the retail store, and if so, the device 110 can operate, until reconfigured for shipment or purchase, Rule 232 specifies that following reconfiguration of the device 110 for shipment, the device 110 should not operate until it is within proximity of the buyer's home (e.g., within range of a cell phone with designated phone number or another enabling device at the destination). Finally, rule 234 provides an override password, that allows someone with the password to operate the device 110 even if another proximity rule 230-232 is not satisfied.

In further variations, one or more proximity rules can require that the proximity devices 120 may be required to be operating in a specified state, such as being used by a particular authenticated user; such as a parent. In addition, the proximity rules can specify a reciprocal relationship, such that two devices can operate only if both devices are in proximity to one another. In addition, the proximity rules can specify that a protected user device 110 can operate if within a predefined proximity of N of a plurality of proximity devices 120, such as any two of three proximity devices 120.

In addition, one or more rules in the proximity rulebase 200 can optionally trigger a local process, such as causing an audible or visual alarm to emanate from the protected device, or causing a message to be transmitted to one or more external devices or addresses notifying them of the condition. For example, a message can be transmitted indicating to the device owner that the protected device has been removed from proximity, or notifying a parent that a child has attempted to use a feature while the protected device is not within authorized proximity.

FIG. 3 is a flow chart describing an exemplary proximity configuration process 300 incorporating features of the present invention. Generally, the protected user device 110 employs the proximity configuration process 300 to monitor the environment of the protected user device 110 to identify devices that are within proximity. The proximity configuration process 300 determines if one or more proximity rules from the laptop proximity rulebase 200 are satisfied. If any proximity rules are satisfied, the protected user device 110 is automatically configured based on the satisfied rule(s).

As shown in FIG. 3, the proximity configuration process 300 initially determines during step 310 if one or more predefined proximity devices 120 are in proximity to the protected user device 110. A test is performed during step 320 to determine if one or more proximity rules from the laptop proximity rulebase 200 are satisfied. If it is determined during step 320 that one or more proximity rules are satisfied, then the device 110 is configured during step 330 based on the action portion of the satisfied proximity rule(s) If, however, it is determined during step 320 that one or more proximity rules are not satisfied, then operation of the device 110 is suspended during step 340.

The owner of the protected user device 110 can specify how often the proximity configuration process 300 needs to verify that the proximity devices 120 are within the defined proximity. For example, the proximity configuration process 300 can be executed on power up, resumption from standby or hibernation, on initiation of one or more functions (such as initiating a call or launching a program), or at a periodic interval. The frequency with which the proximity configuration process 300 executes may vary by time-of-day or proximity context. The proximity configuration process 300 optionally incorporates a number of fail-safe features that ensure that the theft protection aspects of the present invention cannot be bypassed.

As is known in the art, the methods and apparatus discussed herein may be distributed as an article of manufacture that itself comprises a computer readable medium having computer readable code means embodied thereon. The computer readable program code means is operable, in conjunction with a computer system, to carry out all or some of the steps to perform the methods or create the apparatuses discussed herein. The computer readable medium may be a recordable medium (e.g., floppy disks, hard drives, compact disks, or memory cards) or may be a transmission medium (e.g., a network comprising fiber-optics, the world-wide web, cables, or a wireless channel using time-division multiple access, code-division multiple access, or other radio-frequency channel). Any medium known or developed that can stole information suitable for use with a computer system may be used. The computer-readable code means is any mechanism for allowing a computer to read instructions and data, such as magnetic variations on a magnetic media or height variations on the surface of a compact disk.

The memories shown described herein will configure the processors to implement the methods, steps, and functions disclosed herein. The memory could be distributed or local and the processor could be distributed or singular. The memory could be implemented as an electrical, magnetic or optical memory, or any combination of these or other types of storage devices. Moreover, the term "memory" should be construed broadly enough to encompass any information able to be read from or written to an address in the addressable space accessed by processor. In an alternate implementation, the present invention can be implemented using an application specific integrated circuit (ASIC), as would be apparent to a person of ordinary skill in the art.

It is to be understood that the embodiments and variations shown and described herein are merely illustrative of the principles of this invention and that various modifications may be implemented by those skilled in the art without departing from the scope and spirit of the invention.

What is claimed is:

1. A method for configuring a user device, the method comprising:

establishing, in the user device, a configuration rule for the user device, wherein the configuration rule (i) controls a configuration parameter for the user device, and (ii) is based at least in part on a required proximity between the user device and at least a first enabling device, wherein at least the first enabling device is a general-purpose device, and wherein establishing the configuration rule in the device requires no further activation;

determining whether the configuration rule is satisfied;

when the configuration rule is satisfied, configuring the user device according to the configuration parameter, wherein the user device operates in accordance with the configuration parameter; and when the configuration rule is not satisfied, disabling the configuration parameter.

2. The method of claim 1, wherein the configuration parameter comprises whether the user device can operate outside the required proximity.

3. The method of claim 1, wherein the configuration parameter comprises one or more access control parameters of the user device.

4. The method of claim 1, wherein the configuration parameter comprises one or more parental control parameters of the user device.

5. The method of claim 1, wherein the configuration parameter comprises a quiet or mute mode of the user device.

6. The method of claim 1, wherein the disabling of the configuration parameter comprises a suspend mode for the user device.

7. The method of claim 1, wherein an authorized user can override the configuration rule.

8. The method of claim 1, wherein the configuration rule is configurable by an authorized user of the user device.

9. The method of claim 1, wherein the proximity is determined based on the presence of a signal from at least the first enabling device.

10. The method of claim 1, wherein the determining step is performed at least one of upon powering up the user device, upon initiation of a predefined function, periodically, intermittently, and upon the user device resuming operation following a stand-by or hibernate mode.

11. The method of claim 1, wherein the configuration parameter triggers a local process to operate on the user device.

12. The method of claim 1, wherein at least one of the enabling devices provides a proximity environmental cue to the user device.

13. A user device, comprising:
 a memory that is tangible and non-transitory for storing a configuration rule that (i) controls a configuration parameter for the user device, and (ii) is based at least in part on a required proximity between the user device and at least a first enabling device, wherein at least the first enabling device is a general-purpose device; and
 at least one processor, coupled to the memory, operative to:
 determine, without further activation of the configuration rule, whether the configuration rule is satisfied;
 when the configuration rule is satisfied, configure the user device according to the configuration parameter, wherein the user device operates in accordance with the configuration parameter; and
 when the configuration rule is not satisfied, (i) disabling the configuration parameter, and (ii) disabling the corresponding user device operation.

14. The user device of claim 13, wherein the configuration parameter comprises whether the user device can operate outside the required proximity.

15. The user device of claim 13, wherein the configuration parameter comprises one or more access control parameters of the user device.

16. The user device of claim 13, wherein the configuration parameter comprises one or more parental control parameters of the user device.

17. The user device of claim 13, wherein the configuration parameter comprises a quiet or mute mode of the user device.

18. The user device of claim 13, wherein the configuration rule is configurable by an authorized user of the user device.

19. The user device of claim 13, wherein the proximity is determined based on the presence of a wired or wireless connection from at least the first enabling device.

20. The user device of claim 13, wherein the determining step is performed at least one of upon powering up the user device, upon initiation of a predefined function, periodically, intermittently, and upon the user device resuming operation following a stand-by or hibernate mode.

21. The user device of claim 13, wherein the configuration parameter triggers a local process on the user device that activates a quiet mode for the user device.

22. The user device of claim 13, wherein at least one of the enabling devices provides a proximity environmental cue to the user device.

23. An article of manufacture for configuring a user device, comprising a tangible and non-transitory computer readable medium containing one or more programs which when executed implement:
 establishing, in the user device, a configuration rule for the user device, wherein the configuration rule (i) controls a configuration parameter for the user device, and (ii) is based at least in part on a required proximity between the user device and at least a first enabling device, wherein at least the first enabling device is a general-purpose device, and wherein establishing the configuration rule in the device requires no further activation;
 determining whether the configuration rule is satisfied;
 when the configuration rule is satisfied, configuring the user device according to the configuration parameter, wherein the user device operates in accordance with the configuration parameter; and
 when the configuration rule is not satisfied, (i) disabling the configuration parameter, and (ii) disabling the corresponding user device operation.

* * * * *